US012664845B2

(12) United States Patent

Roux et al.

(10) Patent No.: US 12,664,845 B2

(45) Date of Patent: Jun. 23, 2026

(54) HANDS-FREE GATE ACCESS CONTROL SYSTEM AND METHOD OF USE

(71) Applicant: Conduent Business Services, LLC, Florham Park, NJ (US)

(72) Inventors: Pascal Roux, Chabeuil (FR); Thibaut Lemouel, Soyons (FR); Melissa Milheiro Peuble, Charly-sur-Marne (FR)

(73) Assignee: Conduent Business Services, LLC, Florham Park, NJ (US)

( * ) Notice: Subject to any disclaimer, the term of this patent is extended or adjusted under 35 U.S.C. 154(b) by 54 days.

(21) Appl. No.: 18/678,190

(22) Filed: May 30, 2024

(65) Prior Publication Data

US 2025/0285482 A1 Sep. 11, 2025

(30) Foreign Application Priority Data

Mar. 8, 2024 (EP) ..................................... 24315085

(51) Int. Cl.
| | |
|---|---|
| *G07C 9/27* | (2020.01) |
| *G07C 9/10* | (2020.01) |
| *G07C 9/28* | (2020.01) |
| *H04W 64/00* | (2009.01) |

(52) U.S. Cl.
CPC ................ *G07C 9/27* (2020.01); *G07C 9/10* (2020.01); *G07C 9/28* (2020.01); *H04W 64/00* (2013.01)

(58) Field of Classification Search
CPC ... G07C 9/27; G07C 9/10; G07C 9/28; G07C 2209/63; G07C 9/22; H04W 64/00
USPC ...................................................... 340/5.61
See application file for complete search history.

(56) References Cited

U.S. PATENT DOCUMENTS

| | | | | |
|---|---|---|---|---|
| 10,239,494 | B2 * | 3/2019 | Spiess ................... | B60R 25/246 |
| 10,328,898 | B2 * | 6/2019 | Golsch ................... | B60R 25/20 |
| 10,846,962 | B2 * | 11/2020 | Raduchel .............. | H04W 4/021 |
| 11,051,244 | B2 | 6/2021 | Zhou et al. | |
| 11,214,237 | B2 * | 1/2022 | Hasegawa .............. | G01S 11/02 |

(Continued)

FOREIGN PATENT DOCUMENTS

| | | |
|---|---|---|
| EP | 3979219 A1 | 4/2019 |
| WO | 2021108752 A1 | 6/2021 |
| WO | 2023110268 A1 | 6/2023 |

OTHER PUBLICATIONS

"Ultra-Wideband (UWB) Solutions _ NXP Semiconductors—sub section", www.NXM.com White Paper (Nov. 4, 2024).

(Continued)

*Primary Examiner* — Nam V Nguyen

(74) *Attorney, Agent, or Firm* — Jones Burke, PLLC

(57) ABSTRACT

A method and system provide for a hands-free access mechanism. The method includes locating a mobile device using a first radio access technology. The method further includes measuring a signal strength using the first technology and determining that the signal strength meets a predetermined signal strength threshold in order to trigger a location process using a second technology having a more precise location capability than the first technology. The method may further assess environmental conditions upon determining a particular precise location and trigger an access sequence upon detecting the mobile device in a selected position. The access sequence triggered may be impacted by the environmental conditions.

21 Claims, 10 Drawing Sheets

(56) References Cited

U.S. PATENT DOCUMENTS

| | | | |
|---|---|---|---|
| 11,400,889 B2 | 8/2022 | Parthasarathi et al. | |
| 11,409,970 B2 | 8/2022 | Eisendle et al. | |
| 11,553,303 B2 * | 1/2023 | Hasegawa | H04W 4/40 |
| 11,882,455 B2 | 1/2024 | Schober et al. | |
| 11,961,344 B2 * | 4/2024 | Kincaid | G07C 9/00309 |
| 12,192,949 B2 | 1/2025 | Jogi et al. | |
| 2015/0088775 A1 * | 3/2015 | McIntire | G06Q 10/00 |
| | | | 705/325 |
| 2021/0248853 A1 | 8/2021 | Vilhelmsen | |
| 2021/0358237 A1 | 11/2021 | Miller et al. | |
| 2022/0228419 A1 | 7/2022 | Tiso et al. | |
| 2023/0188930 A1 * | 6/2023 | Knott | H04W 4/80 |
| | | | 455/1 |
| 2024/0177554 A1 * | 5/2024 | Kincaid | G07C 9/28 |
| 2024/0300445 A1 * | 9/2024 | Tsukioka | B60R 25/245 |
| 2024/0310937 A1 | 9/2024 | Lehment et al. | |

OTHER PUBLICATIONS

"Trimension® Ultra-Wideband (UWB) _ NXP Semiconductors", www.NXM.com White Paper (Oct. 23, 2024).

"NXP combine sur un seul circuit télémétrie sécurisée et radar à courte portée, fondés sur la technologie UWB" www.NXM.com White Paper (Oct. 9, 2024).

"NXP Collaborates with Shenzhen Tong to Enable the Industry's First UWB-Based Mass Transit Solution _ NXP Semiconductors", www.NXM.com White Paper (Oct. 9, 2024).

"NXP Combines Ultra-Wideband Secure Ranging and Short-Range Radar to Enable Autonomous Industrial and IoT Applications _ NXP Semiconductors", www.NXM.com White Paper (Sep. 10, 2024).

"NXP launches secure UWB chips for hands-free access control, payments and IoT NFCW", www.NXM.com White Paper (Oct. 23, 2020).

European Extended Search Report, dated Sep. 18, 2024, in copending application No. EP24315085.1-1009.

* cited by examiner

INITIAL SIGNAL DETECTION, LOCATION, AND AUTHENTICATION WITH BLE
410

TRIGGER MORE PRECISE UWB LOCATION FUNCTION
420

PERFORM MORE PRECISE LOCATION WITH UWB
430

DETERMINE ENVIRONMENTAL CONDITIONS WITH TRACKING SYSTEM
440

TRIGGER ACCESS SEQUENCE WHEN LOCATION MEETS CRITERIA AND AND ENVIRONMENT MEETS CRITERIA
450

LOOK FOR OBJECTS WITHIN PREDETERMINED DISTANCE FROM GATE, BETWEEN DEVICE AND GATE, AND HANDICAPPED ENTRANTS
710

OBJECTS FOUND?
720

YES

NO

ADJUST ACCESS ACCORDINGLY
730

ALLOW ACCESS
740

MAINTAIN PASSAGE HISTORY TABLE
910

CORRELATE SIGNAL STRENGTH
THRESHOLD WITH RECORDS FROM
PASSAGE HISTORY TABLE
920

ADJUST SIGNAL STRENGTH THRESHOLD
BASED ON CORRELATION
930

HANDS-FREE GATE ACCESS CONTROL SYSTEM AND METHOD OF USE

This application claims priority to EP patent application Ser. No. 24/315,085.1, filed in the European Patent Office on Mar. 8, 2024, the entire contents of which are herein incorporated by reference for all purposes.

TECHNICAL FIELD

Aspects of the present disclosure relate to hands-free access to reserved, restricted, or otherwise controlled areas, spaces, or activities.

BACKGROUND

Access controls are used to restrict access to various locations. For example, in public transit stations, access to a platform or other controlled area is restricted to holders of a valid ticket or otherwise authorized persons. Access controls may require a user to traverse a passage selectively closed by obstacles or access points or barriers. Such access points or barriers can be of various shapes, sizes, and configurations. Examples of such barriers can include turnstiles, gates, drop arms, etc.

Access can be achieved through various options such as providing or scanning a ticket, using a smartcard/datacard, using a number pad for access, etc. However, these methods require the person seeking access to use their hands to present/scan a ticket, present a smartcard/datacard, or provide a code. For persons that are differently abled or have physical challenges, it may be difficult to gain quick access when taking physical actions to trigger the access. Further, during certain times of high traffic flow, such as rush hour on public transit or at the beginning of a sporting event or concert, the large number of users looking to gain access may create a bottleneck at entries relying on the physical actions of the users. In such situations, it may be desirable to provide hands-free access, where access is gained through a process of automatic communication between the entry gate or barrier and an electronic communication device carried by the user.

While certain methods of hands-free access for these situations exist, the current solutions are not reliable to provide steady, predictable traffic flow and may be inconsistent in providing access to users based on the technology used. For example, in some systems, the opening distance is unstable (i.e., the distance a user must be from the gate or entry barrier before the hands-free technology is engaged or actuated varies), due to the positioning of the device and to obstacles in the adjacent environment (human body, metallic object, other objects inserted between the gate antenna and the device). This can result in problems such as the gate opening too early, which can lead to the passage of another user who precedes or is in front of the person whose device has triggered the opening of the gate or barrier. Sometimes the gate may open too late, which imposes a slowdown or even a stop of the user.

As typically no angle is associated with the distance, applications have been limited to one gate to avoid the risk of opening an adjacent gate if it is also equipped with hands-free validations.

SUMMARY

Exemplary embodiments of the present disclosure may solve one or more of the above-mentioned problems and/or may demonstrate one or more of the above-mentioned desirable features. Other features and/or advantages may become apparent from the description that follows.

In accordance with at least one exemplary embodiment, a method for access control at an access point is provided. The method includes locating a mobile or wireless device using a first radio access technology (RAT) having a first location capability. The method further includes measuring a signal strength using the first RAT and determining that the signal strength meets a predetermined signal strength threshold. The method further includes triggering a location determination process to locate the mobile device upon determining the signal strength meets the predetermined signal strength threshold. The location determination process is executed using a second RAT having a second location capability more precise than the first location capability. The method further includes detecting, through the location determination process, that the mobile device is in a selected position relative to the access point and triggering an access sequence upon detecting the mobile device in the selected position.

In additional embodiments, the method further includes performing an optical detection process to further locate objects within a predetermined distance of the access point and determine a position of the mobile device with respect to a different access point. In embodiments provided herein, the method selects the access sequence based on one or more of these determinations In yet a further embodiment, a system is provided for access control. The system includes at least one access point and multiple antennas mounted to the access point, the antennas communicating with a mobile device. The system additionally includes a processor controlling an access mechanism of the access point and executing instructions to perform multiple operations. The multiple operations include locating the mobile device using a first radio access technology (RAT), the first RAT having a location capability, measuring a signal strength using the first RAT and determining that the signal strength meets a predetermined threshold. Further, the operations include triggering a location determination process to locate the mobile device upon determining the signal strength meets the predetermined threshold. The location determination process is executed using a second RAT having a more precise location capability than the first RAT. The operations further include detecting, through the location determination process, that the mobile device is in a selected position and triggering an access sequence upon detecting the mobile device in the selected position, causing opening of the access mechanism.

In embodiments provided herein, the system additionally includes an optical detection system to further ascertain the immediate environment by locating objects within a predetermined distance of the access point and/or determining a position of the mobile device with respect to a different access point. The access sequence may be determined based on one or both of these determinations.

In an additional embodiment, a method is provided for operating an access mechanism at an access point. The method includes performing initial signal detection utilizing a first RAT allowing an information exchange between a control system and a mobile device and triggering a location determination process performed by a second RAT to locate the mobile device upon determining that a signal strength measured with the first RAT meets a predetermined threshold. The method additionally includes receiving a notification through the location determination process that the mobile device is in a selected position relative to the access point and utilizing an additional detection system to assess conditions surrounding the mobile device and the access point. The method further includes triggering an access sequence upon detecting the mobile device in the selected position and the surrounding conditions meeting specified criteria.

Additional objects, features, and/or advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the claims; rather the claims should be entitled to their full breadth of scope, including equivalents.

BRIEF DESCRIPTION OF THE DRAWINGS

The present disclosure can be understood from the following detailed description, either alone or together with the accompanying drawings. The drawings are included to provide a further understanding of the present disclosure, and are incorporated in and constitute a part of this specification. The drawings illustrate one or more exemplary embodiments of the present teachings and together with the description serve to explain certain principles and operation.

DETAILED DESCRIPTION

Figure 1:
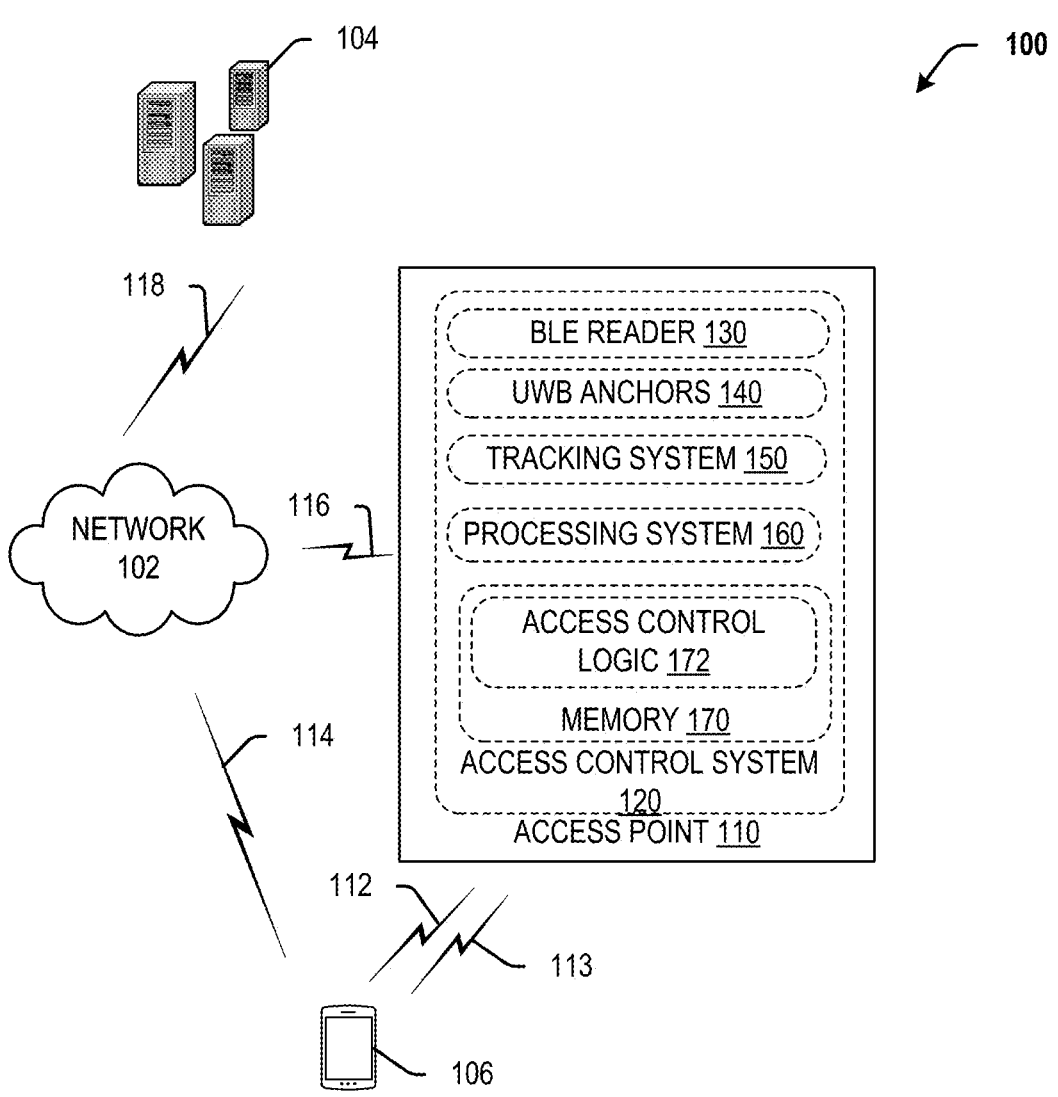
FIG. 1 is a block diagram illustrating a system environment in accordance with embodiments described herein.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements.

Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

The present disclosure contemplates access controls in various access points, including, for example handicapped accessible and/or handsfree access points adjacent to more standard access points. The present disclosure also contemplates multiple handsfree access points adjacent to one another. Systems and methods provided herein allow passage in a calculated manner to prevent passage of unauthorized persons and further ensure that entrants are able to pass through the access points without interference.

While embodiments of the disclosure are described in connection public facilities such as rail, bus, or other transit facilities, embodiments of the disclosure can be used in any other circumstance in which access of individuals to a restricted area is to be controlled based on tickets, passes, tokens, or other forms of validation. Such other forms of validation could include numerical keypads, fingerprint scanners, retina scanners, voice pattern scanners, etc. Examples of other facilities in which access controls of the disclosure may be used include entertainment venues, sports venues, office buildings, airports, etc.

FIG. 1 is a block diagram illustrating a system environment 100 in accordance with embodiments described herein. An access point 110 may include an access control system 120 that functions to regulate access of entrants through the access point 110. Although only one access point 110 and only one access control system 120 is shown, generally multiple adjacent access points 110 each will have an independent access control system 120. The access control system 120 may communicate over wireless communication links 112 and 113 with a wireless device 106. Although only one wireless device 106 is shown, it should be understood that multiple wireless devices 106 can communicate with the access control system over wireless communication links 112 and 113. Further, both wireless devices 106 and access control systems 120 may communicate over wireless communication links 114, 116 with a network 102. Servers 104 may also communicate with the network 102 over communication link 118. The servers 104 may store authentication information, historical passage information, or any other information that may be utilized by the wireless devices 106 or access control systems 120.

The wireless devices 106 may include, for example, end-user wireless devices. Wireless devices 106 may be any device, system, combination of devices, or other such communication platform capable of communicating wirelessly with access control system 120 using one or more radio access technologies (RATs). Each of the wireless devices 106 may be, for example, a mobile phone, a wireless phone, a wireless modem, a personal digital assistant (PDA), a voice over internet protocol (VoIP) phone, a voice over packet (VOP) phone, a soft phone, a smart card, as well as other types of devices or systems that can exchange data with the access controls system 120. Further, the wireless devices 106 may offer Wi-Fi, Bluetooth Low Energy (BLE), Ultra-wideband (UWB) or other types of communication links 112, 113, 114.

Further, the communication links 112, 113 can be or include, for example, UWB and BLE communication links. The BLE communication links 112 can be utilized, for example for authentication and general location information. The process of general location can utilize RSSI values provided by wireless devices to the access control system 120 to estimate distance. BLE is generally available using commercially available wireless devices 106 and BLE readers available from multiple vendors. In addition to extending the battery life dramatically, one of the big improvements of BLE over previous Bluetooth® solutions is that the devices can broadcast short messages in a connectionless fashion and do not need to be paired. Thus, BLE capable devices can quickly identify each other without user intervention. As part of broadcast message decoding, BLE functionality on the wireless devices 106 can return RSSI values as well as authentication information over the communication link 112. This information can be used to locate and authenticate the wireless devices 106.

While the BLE communication links 112 can be utilized for authentication and preliminary location functionality, UWB technology is able to locate the wireless devices 106 with much more precision than the BLE technology. While BLE technology can determine a general location within an accuracy of one to four meters, this is not sufficient for precise access control in most instances. Accordingly, UWB communication links 113 may be utilized to locate a wireless device after an initial determination made over BLE communication links 112. UWB technology uses low power consumption to achieve high bandwidth connections and can be used to accurately determine the location of objects or people within a few centimeters. Thus, UWB is particularly useful for applications where precise location information is relied upon. The location is accomplished using UWB measurements including time of flight (ToF), time difference of arrival (TDoA) and angle of arrival (AoA) as will be further described below.

Communication links 114, 116, 118 can use any suitable communications protocol including either wired or wireless protocols. Further, the communication links can be frequency division duplexing (FDD) or time division duplexing (TDD) communication links and can include uplink and/or downlink communication links. The communication links 114, 116, 118 can use various communication media, such as air, space, metal, optical fiber, or some other signal propagation path, including combinations thereof. Communication links 114, 116, 118 can use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, 6G or combinations thereof. Other wireless protocols can also be used.

Network 102 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Other network structures are within scope of the disclosure.

The access control system 120 may be configured to perform the methods and operations disclosed herein to optimize access through access points 110 by operating in conjunction with the wireless device 106. In the disclosed embodiments, the access control system 120 may be integrated with an access point 110. Further, the components of the access control system 120 may be distributed so that one or more components is located at the access point 110 and other components are located at wireless devices 106 or at other access points 110 or at servers 104.

The access control system 120 may be configured for collecting data transmitted by the wireless devices 106. To perform the operations described herein, the access control system 120 may utilize a processing system 160 and a memory 170. The processing system 160 may include a processor executing stored logic in the memory 170. The memory 170 may include a RAM, ROM, disk drive, a flash drive, a memory, or other storage device configured to store data and/or computer readable instructions or codes (e.g., software). Stored logic 172 may include access control logic which may include computer executable instructions or codes accessed and executed by the processor 160 to perform various methods disclosed herein. Software stored in the memory 170 may include computer programs, firmware, or other form of machine-readable instructions, including an operating system, utilities, drivers, network interfaces, applications, or other type of software. Further, the memory 170 may store collected data, which may be or include data collected from the wireless devices 106. To perform the operations described herein, the access control logic 172 may be executed by the processor 160 to operate on collected data. Processor 160 may be a microprocessor and may include hardware circuitry and/or embedded codes configured to retrieve and execute software stored in memory 170.

In embodiments disclosed herein, the access control system 120 additionally includes a BLE reader 130, UWB anchors 140, and a tracking system 150. The BLE reader 130 and the UWB anchors 140 interact with functionality provided on the wireless devices 106. The BLE reader 130 may include a beacon in the form of a battery powered BLE radio transmitter or alternatively may utilize a main electrical supply. The beacon of the BLE reader 130 may be configured to constantly broadcast messages. The messages typically include at least an identifier and potentially additional information. The wireless devices 106 are capable of scanning for these messages from the BLE beacon and may utilize them in conjunction with a mobile application. Further, the BLE reader 130 may receive information pertaining to wireless device locations, such as received signal strength indicator (RSSI) from wireless devices 106. In embodiments set forth herein, the wireless devices 106 may send these parameters to the access control systems 120, which analyzes this information in order to determine a device location. With beacons placed at fixed known locations, distances can be measured based on signal strength and a wireless device 106 or the access control system 120 can calculate a location of the wireless device 106 using a trilateration or triangulation technique. Further, in embodiments disclosed herein, the BLE reader 130 can be utilized for authentication or authorization of wireless devices in a manner known in the art.

UWB anchors 140 are electronic devices that detect UWB pulses emitted by UWB tags of the wireless devices 106, which are utilized by the access control system 120 for calculating tag positions, i.e., wireless or mobile device positions. In embodiments set forth herein, at least one UWB anchor 140 is installed at each access point 110. In additional embodiments, UWB anchors 140 are shared between access points 110 and are variously located. UWB anchors 140 and tags in wireless devices 106 can perform location identification without the aid of GPS, by using a number of pulses and communications that allow for trilateration or triangulation to determine how far apart the tags of the wireless devices 106 are from other locations, such as for example, other access points 110.

The tracking system 150 may be or include an optical detection system including multiple two dimensional or three dimensional cameras or optical barriers and/or sensor cells utilized for detecting objects in the area of the access points 110 other than the wireless devices 106. The tracking system 150 may further detect the proximity of a wireless or mobile device to an alternate access point 110. In embodiments disclosed herein, the access control system 120 may include further components such as communication interfaces and user interfaces (not shown). Communication interfaces may include hardware components, such as network communication ports, devices, routers, wires, antenna, transceivers, etc. User interfaces may include hardware components, such as touch screens, buttons, displays, speakers, etc. Other components such as a power management unit, a control interface unit, etc. may be included.

Figure 2:
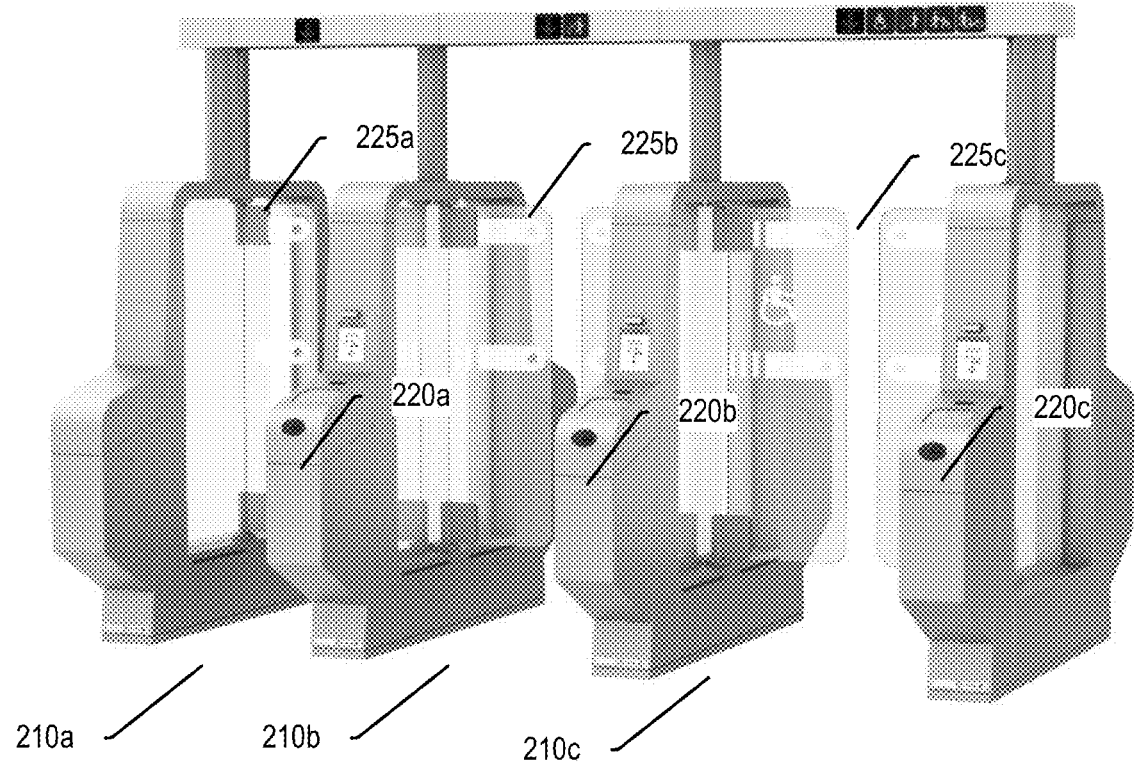
FIG. 2 illustrates multiple access points utilized in accordance with embodiments described herein.

FIG. 2 illustrates an assembly 200 of multiple access points 210a, 210b, 210c utilized in accordance with embodiments described herein. Individual access points 210a, 210b, 210c may house corresponding access control systems 220a, 220b, 220c, which are responsible for generating an access control sequence to allow access through access mechanisms 225a, 225b, 225c. The access control points 210a, 210b, 210c may be or include, for example, fare collection points, security screening points, entry points, or a passage within a transit system. The access mechanisms 225a, 225b, 225c may be or include, for example, a gate, a door, or other physical obstruction requiring activation in order to enable passage. Accordingly, by executing access control logic as described above with respect to FIG. 1, the access control systems 220a, 220b, 220c cause an activation sequence to enable passage through the access mechanisms 225a, 225b, 225c respectively. Thus multiple adjacent access points 210a, 210b, 210c are associated with corresponding access control systems 220a, 220b, 220c.

It should be noted that the access control system 220a, 220b, and 220c may operate independently. Further, through methods described herein, the access control system 220a may initiate an authentication process with a wireless device

106 when the wireless device approaches access point 210a, but may ultimately find that the wireless device 106 is closer to the access point 210b. In this instance, the access control system 220a releases the wireless device 106 and the access control system 220b initiates an authentication process.

Figure 3:
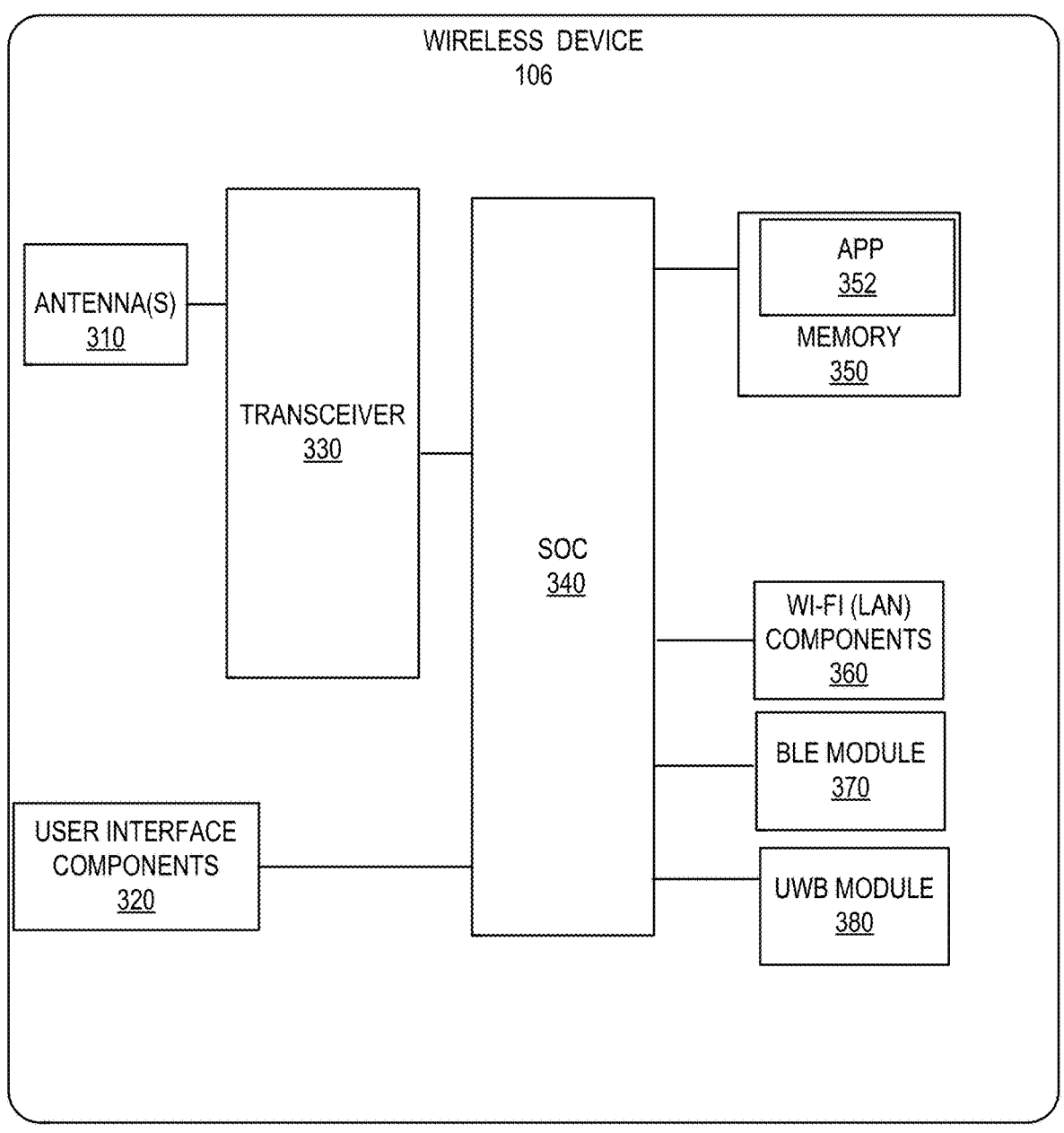
FIG. 3 is a block diagram illustrating a mobile or wireless device utilized in accordance with embodiments described herein.

FIG. 3 is a block diagram illustrating a wireless device 106 utilized in accordance with embodiments described herein. The wireless device 106 may correspond to the wireless device 106 shown in FIG. 1. The components described herein are merely exemplary as many different configurations for the wireless device 106 may be implemented. The wireless device 106 may include, for example, multiple antennas for communicating with a cellular network such as antennas 310. The antennas 310 may include, for example, multiple transmission (Tx) antennas and multiple receiving (Rx) antennas. Different antennas may connect with different component carriers and different frequency bands. The wireless device 106 may further include a transceiver 330, a system on chip (SoC) 340, a memory 350, Wi-Fi or LAN components 360, and user interface components 320 that may operate to allow set-up or use of the wireless device 106.

The wireless device 106 may further include a system on chip (SoC) 340, which may be an integrated circuit that integrates most or all components of a computer or other electronic system. The SoC 340 includes a central processing unit (CPU), memory interfaces, on-chip input/output devices, input/output interfaces, and secondary storage interfaces. Other components, such as a radio modem and radio frequency signal processing may also be included. The SoC 340 integrates a microcontroller, microprocessor or several processor cores with peripherals like a GPU, Wi-Fi and cellular network radio modems, and/or one or more coprocessors.

The wireless device 106 may further include a memory 350, which may store, for example, data and reporting instructions executed by a processor of the SoC 340 to cause the wireless device 106 to send reports to the access control system 120. The reports may include, for example, SINR, RSRP, RSRQ, RSSI and/or other parameters indicative of signal strength, quality, or location. In embodiments provided herein, particular instructions may be included in a mobile application 352 that triggers interaction with the access control system 120, 220a, 220b, 220c. Further, the mobile application 352 may interact with a BLE module 370 and a UWB module 380 of the wireless device 106 in order to facilitate access control. For example, in embodiments provided herein, the mobile application 352 instructs the BLE module 370 to exchange authentication information with BLE beacons of the BLE reader 130 of the access control system 120. As a further example, the mobile application 352 may instruct the BLE module 370 to trigger a transition from the BLE module 370 to the UWB module 380 when a signal strength threshold is reached.

Figure 4:
FIG. 4 is a flow chart illustrating a method for hands-free access control in accordance with embodiments described herein.
Figure 4:
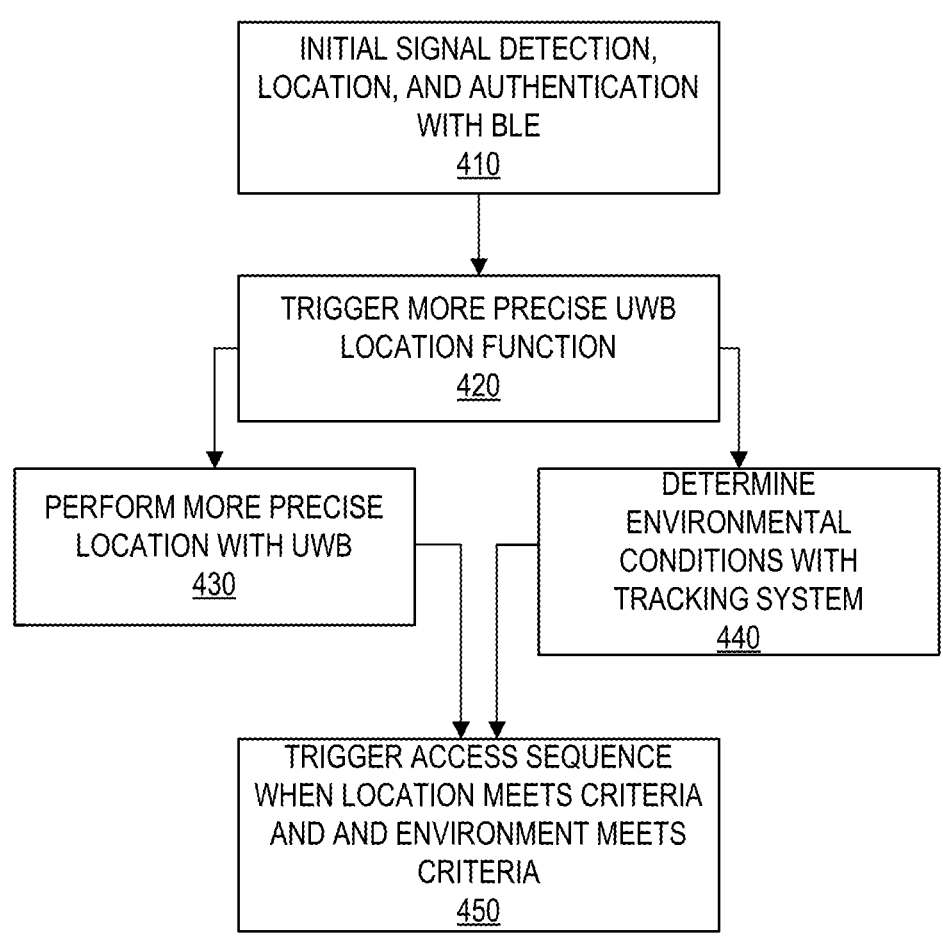

FIG. 4 is a flow chart illustrating a method 400 for hands-free access control in accordance with embodiments described herein. Method 400 may be performed by any suitable processor discussed herein, for example, the processor 160 included in the access control system 120, 220a, 220b, 220c or any other suitable processor. Further, the method may be performed by a combination of processors including a processor of the wireless device 106. For the sake of convenience, the method is described as being performed by the processor 160.

Method 400 starts in step 410, when the processor 160 executes initial signal detection, authentication, and general location using a first RAT, such as BLE. Initial signal detection may include low power discovery and wake-up. The wireless device 106 and the access control system 120 are able to discover one another without user intervention based on BLE beacons from the BLE reader 130 of the access control system 120. Authentication may include, for example, a credential exchange with the wireless device 106 in response to a received BLE broadcast beacon. General detection may include using BLE to generally locate the wireless device 106 within the vicinity of an access point 110. As explained hereinabove, the BLE technology is able to locate the wireless device 106 to between an accuracy of one to four meters, which is insufficient for precisely controlling an access mechanism. In embodiments provided herein, the location of the wireless device 106 may be associated with an RSSI threshold.

Accordingly, when the RSSI threshold is reached, the wireless device 106 in combination with the access control system 120 may trigger a more precise UWB location function in step 420. As the UWB technology demands more power than the BLE technology, the UWB location function is activated only on demand when the RSSI threshold is reached. In embodiments provided herein, when the RSSI reaches the predetermined threshold, the processor 160 instructs the wireless device 106 to execute a handover from BLE to UWB in step 420, thus triggering the more precise location function with UWB. The triggering of the UWB location function in step 420 includes link set-up negotiation, a physical radio frequency layer handover, and UWB synchronization. In embodiments provided herein, even upon the triggering of the UWB location function, BLE remains active and is utilized for algorithmic processing.

In step 430, the wireless device 106 and the access control system 120 begin secure ranging to locate the wireless device 106 relative to an access point 110. UWB technology allows the wireless device to be geolocated within approximately ten centimeters so that an access mechanism can safely be opened without the risk of opening an adjacent access mechanism. Step 430 may include locating the wireless device 106 using UWB and comparing the location to a selected position, such as the position 195 of FIG. 10 as will be further explained below. The selected position may be a geographic range, for example, within a predetermined distance such as two meters from the access point 110 and within an angular range, for example sixty degrees to negative sixty degrees from the access point 110, to determine if the wireless device 106 is in a close enough position to the access point 110 to activate the access mechanism.

As shown in FIG. 4, the processor 160 may determine surrounding conditions in step 440 simultaneously with performing location with UWB in step 430. As a further alternative, the processor 160 may determine the surrounding conditions after the processor 160 finds that the position of the wireless device is the selected position 195, which may be a geographic range considering both distance and angle of approach as described with respect to FIG. 10 below. In either case, the processor 160 utilizes the tracking system 150 of the access control system 120 to assess the surrounding conditions. Assessment of the surrounding conditions may include, for example, once the wireless device 106 is in a passageway of the access point 110, associating the UWB-geolocation with surrounding conditions ascertained by another detection system, which may be a pre-existing system, such as the tracking system 150. As set forth above, the tracking system 150 may include, for example, 3D cameras or sensor cells. The tracking system 150 may perform a supplemental location function, which includes for example, locating other passengers, entrants or objects between the wireless device and the access mechanism or locating a proximity of the wireless device 106 to another access point 110. This supplemental location function aids in determining an appropriate access sequence or opening time for an access mechanism. For example, if the wireless device user is alone in the passageway of a particular access mechanism, the access control system 120 can open the gate earlier. Alternatively, if the supplemental location function identifies another entrant between the access mechanism and the wireless device user, the access control system waits to activate the access mechanism. Further, the supplemental detection system may locate a wheelchair or a passenger with disabilities and may therefore cause a longer activation sequence to ensure that the wireless device user is able to pass through the access mechanism without it prematurely closing.

Thus, in step 450, the processor 160 triggers an access sequence when the wireless device is found to be in the selected location 195 (FIG. 10) and the surrounding conditions meet predetermined criteria. For example, a door unlock sequence is triggered at a configurable distance. As set forth above, the predetermined criteria accounts for objects and humans inserted between the access mechanism and the wireless device to avoid opening an access mechanism too early or too late, thus avoiding unauthorized passage, unnecessary slowdowns, or gates closing prematurely on wireless device users. In this manner, the access control system 120 ensures that the correct access point 110 is made available to the wireless device 106 and further that no unauthorized access is granted. Additionally, for a handicapped access point or for a disabled person approaching any access point, the access control system 120 can ensure that sufficient time is allowed for the wireless device holder to pass through the gate.

Figure 5:
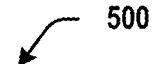
FIG. 5 is a flow chart illustrating further details of a method utilized for access control in accordance with embodiments described herein.
Figure 5:
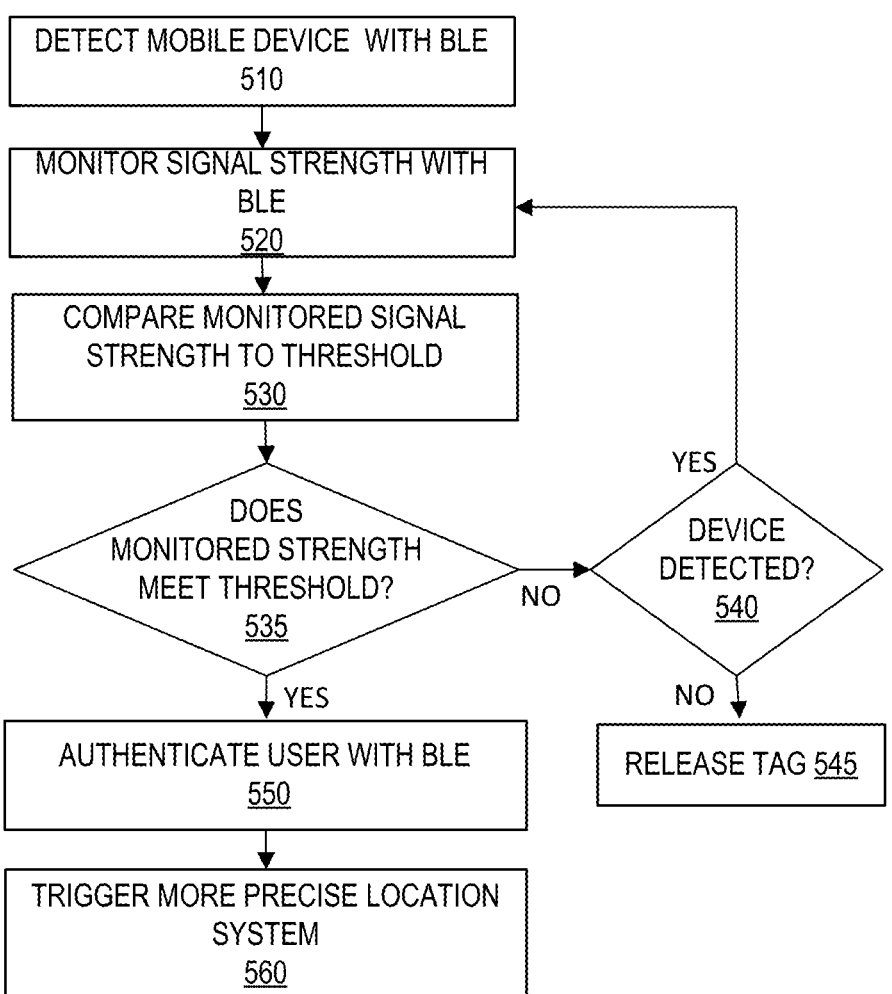

FIG. 5 is a flow chart illustrating further details of a method 500 utilized for access control in accordance with embodiments described herein. Specifically, FIG. 5 further refines the process of step 410 of FIG. 4 in which initial signal detection, authentication, and general location are performed. Method 500 may be performed by any suitable processor discussed herein, for example, the processor 160 included in the access control system 120 or any other suitable processor. Further, the method may be performed by a combination of processors including a processor of the wireless device 106. For the sake of convenience, the method is described as being performed by the processor 160.

In step 510, the access control system 120 detects a mobile device. In embodiments described herein, this process is performed using BLE RSSI-ranging. For example, the BLE reader 130 includes BLE beacons that connect to wireless devices 106. The BLE beacons broadcast a signal, which may, for example, have a reach of fifty to seventy meters. Other ranges are within scope of the disclosure. The wireless device 106 receives the broadcast signals. In embodiments described herein, a mobile application on the wireless device 106 causes the wireless device to interact with the access control system 120 in response to the received signals.

In step 520, signal strength is monitored. In embodiments described herein, the signal strength or RSSI may be measured and reported by the wireless device 106 to the access control system 120.

In step 530, the processor 160 of the access control system 120 compares the RSSI to a stored RSSI threshold. Because RSSI location measurements through BLE are accurate to a distance of one to four meters, the RSSI threshold may be correlated with a distance greater than this range. For example, the RSSI threshold may be set to correspond to an expected distance of five meters from the access point. As will be described further below, the stored RSSI threshold may be configurable to a particular wireless device 106 or to a particular access control system 120.

In step 535, the processor 160 determines if the monitored RSSI meets the stored threshold. If the monitored RSSI meets the stored threshold at 535, the processor 160 continues to steps 550 and 560. However, if the RSSI does not meet the stored threshold in step 535, the processor may determine if the wireless device 106 is still detected in step 540. If the wireless device 106 is no longer detected at 540, the processor 160 may release the BLE tag of the wireless device 106 at step 545. If the device is still detected at 540, then the processor 160 continues to monitor signal strength at step 520.

However, when the RSSI meets the stored threshold in step 535, the processor 160 authenticates the user in step 550 through a credential exchange and triggers the more precise UWB location function in step 560 by causing the wireless device 106 to execute a handover from BLE to UWB. Because BLE is power efficient, this process causes little battery drain. The more power intensive UWB process is then triggered to enhance location accuracy.

Figure 6:
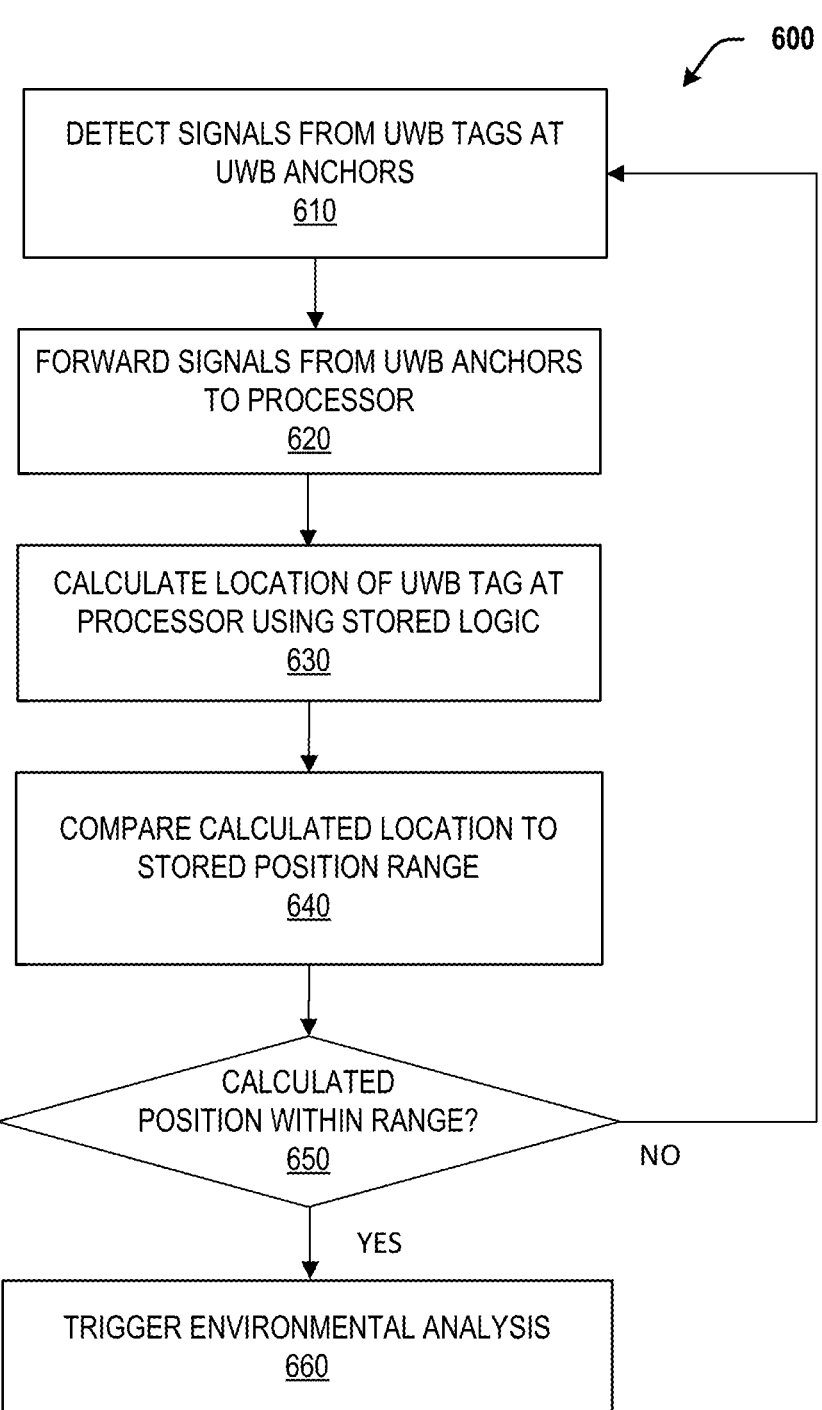
FIG. 6 is a flow chart illustrating further details of a method utilized for access control in accordance with embodiments described herein.

FIG. 6 is a flow chart illustrating further details of a method 600 utilized for access control in accordance with embodiments described herein. More specifically FIG. 6 illustrates the more precise UWB location process triggered as described above. Method 600 may be performed by any suitable processor discussed herein, for example, the processor 160 included in the access control system 120 or any other suitable processor. Further, the method may be performed by a combination of processors including, for example, a processor of the wireless device 106. For the sake of convenience, the method is described as being performed by the access control system 120.

In step 610, the access control system 120 detects signals from UWB tags of the wireless devices 106 at the UWB anchors 140. In step 620, the UWB anchors 140 may forward the signals to the processor 160.

In step 630, the processor 160 may calculate the location of the wireless device having the UWB tag using stored logic 172. The stored logic may include ToF calculation logic, which determines distance, but not direction, as well as AoA information for calculating an angle of arrival. The stored logic 172 may further include time difference of arrival (TDoA) calculation logic.

UWB can accurately track pulses at an exceptionally high rate of repetition. Thus, the ToF calculation can be accurately made even at very close range within ten cm. ToF establishes the distance between an anchor 140 associated with the access point 110 and the wireless device 106 using speed of light. The TDoA calculation is accomplished through the use of multiple anchors. When a tag represented by wireless device 106 communicates with more than one anchor, the differential in the distance between the tag and each of the anchors reveals how much closer the tag is to one anchor than the other. The tag position may be defined when at least three UWB anchors are utilized so that trilateration or triangulation can be performed. AoA measurements utilize two or more collocated antennas on the anchor 140 to measure slight differences between the signal received at each. These differences can be used to determine the AoA.

In step 640, the calculation position information can be compared to stored position information. Stored position information may include, for example, a range of positions that place the object close enough to the access point 110 such that triggering the access mechanism should be considered. For example, the stored position information may include a distance of two meters or less and an angle of approach between negative and positive sixty degrees. Further, in some embodiments, when the position information puts the wireless device 106 in the stored range, the access control system 120 may trigger the tracking system 150 to assess surrounding conditions.

Thus, if, in step 650, the calculated position is not within the stored range, then the access control system 120 may continue to detect signal in step 610. However, if, in step 650, the calculated position is within the stored range, the processor 160 triggers analysis of the surrounding environment in step 660. The surrounding environment analysis may be conducted, for example, by a pre-existing tracking or optical detection system, such as tracking system 150.

Figure 7:
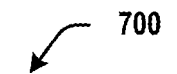
FIG. 7 is a flow chart illustrating further details of a method utilized for access control in accordance with embodiments described herein.
Figure 7:
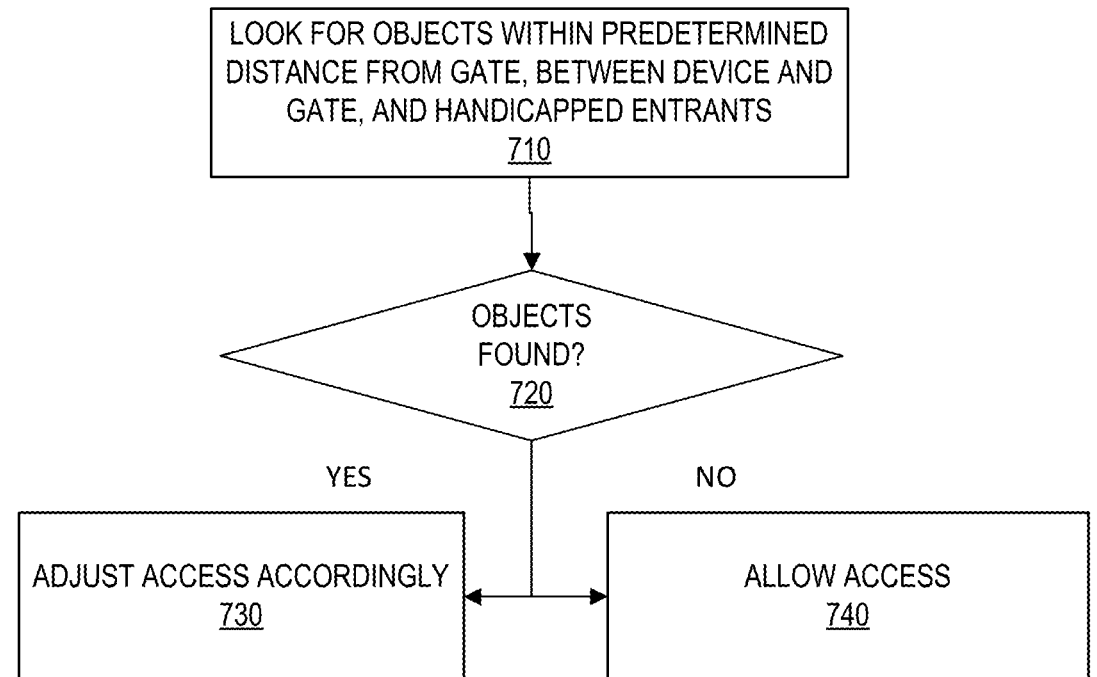

FIG. 7 is a flow chart illustrating further details of a method 700 utilized for access control in accordance with embodiments described herein. More specifically, FIG. 7 identifies steps involved in environmental analysis performed subsequent to or contemporaneously with UWB ranging. The method of FIG. 7 is described herein as being performed by the access control system 120.

In step 710, the tracking system 150 looks for objects between a wireless device user and the access point 110. Further, the tracking system identifies disabled users, for example, by identifying canes or wheelchairs proximal to the wireless device 106. Thus, while the BLE and UWB exchanges are able to locate the wireless device 106 relative to one or more access points 110, the BLE and UWB processes do not locate other objects that might be between the access point and the wireless device 106. The tracking system 150 fills this gap in step 710.

If the environmental analysis of step 710 does not reveal objects between the wireless device 106 and the access point 110, does not reveal any handicapped users, and does not show that the wireless device 106 is actually closer to a different access point 110' than the one associated with the access control system 120, then the access control system 120 may allow access immediately in step 740.

However, if any of the above-identified environmental conditions is found in step 720, then, in step 730, the access control system 120 may utilize the stored logic 172 to adjust an access control sequence. For example, if another entrant is found between the wireless device 106 and the access point 110, triggering of the access mechanism may be delayed until the other entrant exits the area. Further, if the wireless device holder is closer to a different access point 110' due to the way the wireless device is held or positioned, the access sequence may be paused, halted, or dropped entirely so that a dialog can be created between the wireless device 106 and a different access control system 120' in order to avoid allowing access at two different access points for the same wireless device 106. As an additional alternative, if a handicapped or disabled user is detected, the access may be adjusted to trigger opening immediately, but delay closing in order to ensure that passage of the wireless device 106 and associated entrant is complete.

Figure 8:
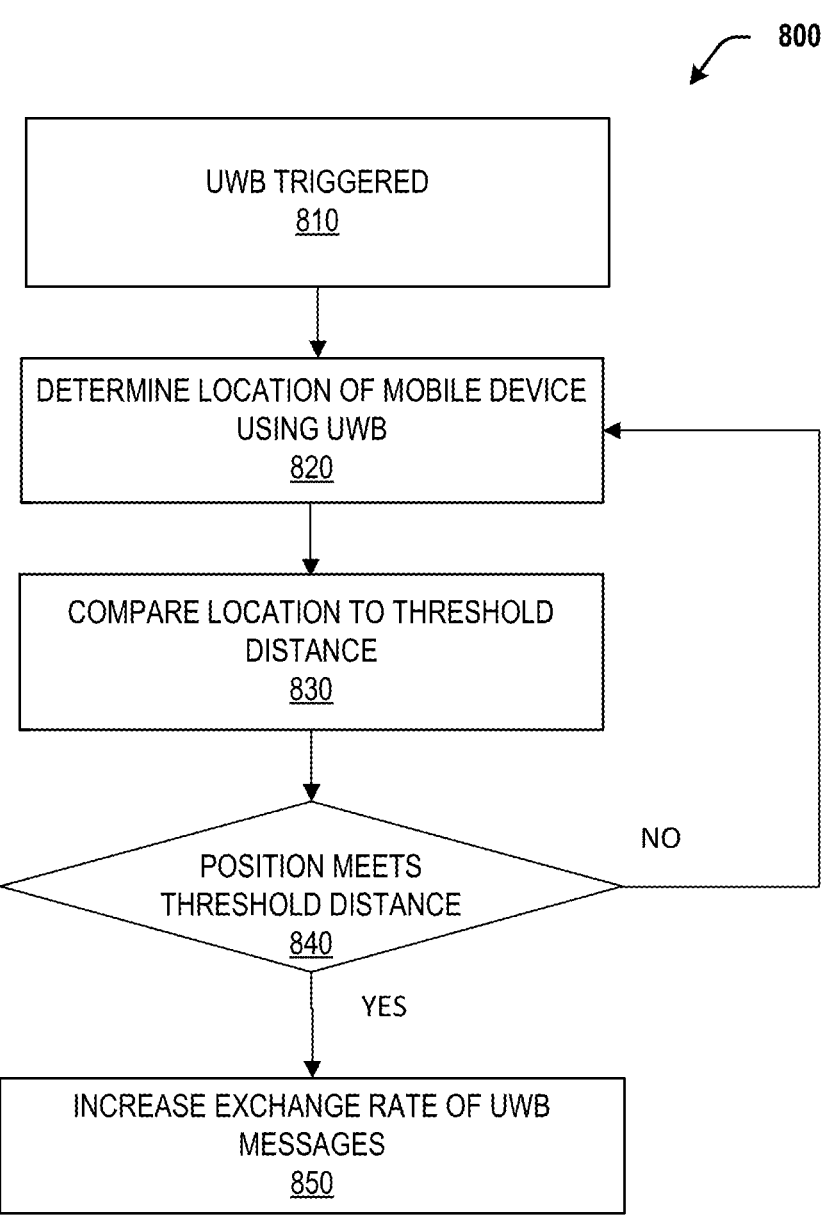
FIG. 8 is a flow chart illustrating further details of a method utilized for access control in accordance with embodiments described herein.

FIG. 8 is a flow chart illustrating further details of a method 800 utilized for access control in accordance with embodiments described. More specifically, the method 800 relates to performing accurate UWB positioning while limiting power consumption and the use of the frequency spectrum.

In step 810, UWB is triggered through the BLE driven process as described above. In step 820, the process commences through determination of a mobile device location using UWB. Step 830 introduces a threshold distance that may be used in the UWB location process. Specifically, based on the parameters of the specific access system, a specific threshold distance may be defined after which the UWB process begins more complex exchanges to achieve a more accurate determination of wireless device position. Thus, in step 840, if the position does not meet the threshold distance, the UWB location process continues as described by reverting to step 820. However, if the position calculated meets the threshold distance, the UWB anchors 140 increase the exchange rate of UWB messages in step 850. In step 850, more accurate UWB positioning is obtained through more complex exchanges, but only once the user enters a restricted UWB range area defined by the threshold distance. Thus, more complex exchanges occur through UWB as the wireless device 106 approaches the access point 110. For example, to initiate UWB ranging, when outside of the threshold distance, communications might occur every 300 ms, but once the wireless device meets the threshold distance, communications might occur every 100 or 200 ms. Further, it should be noted that the access control system 120 may utilize one or more additional UWB anchors to improve UWB location.

Figure 9:
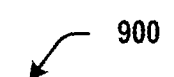
FIG. 9 is a flow chart illustrating further details of a method utilized for access control in accordance with embodiments described herein.
Figure 9:
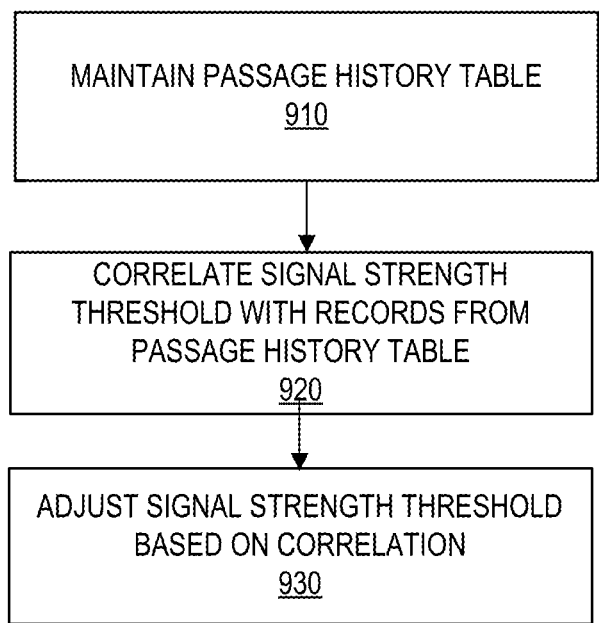

FIG. 9 is a flow chart illustrating further details of a method 900 utilized for access control in accordance with embodiments described herein. More specifically, the method 900 illustrates configurability of the RSSI threshold for the BLE to UWB handover trigger. As set forth above, because the UWB technology demands more power than BLE, it is activated on demand by the BLE process in order to reduce the power consumption of the wireless device 106. The handover is triggered by the determination that RSSI has reached a predetermined threshold.

The RSSI is the strength of the UWB beacon signal as seen on the receiving wireless device 106. The signal strength depends on distance and broadcasting power value. Further, the measured RSSI varies due to external factors influencing radio waves such as absorption, interference, or diffraction. Additionally, RSSI tends to fluctuate. The further away the wireless device 106 is from the UWB beacon, the more unstable the RSSI becomes.

The RSSI threshold can also be very different for each wireless device 106 because of the way the wireless device user holds the wireless device 106 and because of the immediate environment of the wireless device 106, such as for example, a type of cover on the wireless device 106. Accordingly, in embodiments disclosed herein, a calibration can therefore be done, on the one hand, by a self-readjustment of the RSSI threshold of each wireless device 106 using a passage history table. The passage history table may be stored in a memory of the wireless device 106, at the access control system 120, servers 104, or any other accessible location. If access points 110 do not have the same performance, the access control systems 120 will also self-readjust the RSSI threshold they send to the wireless devices through learning related to previous validations.

The method 900 of FIG. 9 can be performed for example by a processor of the wireless device 106 to adjust an RSSI threshold for that particular wireless device 106. Alternatively, a similar method 900 can be performed by an access control system 120 based on a particular BLE signal strength at the access point 110.

In step 910, the wireless device 106 maintains a passage history table. The passage history table may track, for example, the amount of time between the meeting of the RSSI threshold and the UWB determination that the wireless device 106 has arrived at the selected position. Further, the passage history table may determine the distance of the wireless device 106 from the access point 110 at the initial UWB measurement. Because the BLE exchange may be calibrated to trigger a handover to UWB at an RSSI indicating a distance of approximately five meters from the access point, the initial UWB measurement may be recorded to determine the actual distance of the wireless device from the access point.

In step 920, the wireless device 106 correlates the RSSI threshold with records from the passage history table. For example, the wireless device 106 may discover that when UWB was triggered, the wireless device was more than five meters from the access point or alternatively that the amount of time between meeting of the RSSI threshold and the UWB final position determination is longer than an average time. Alternatively, the wireless device 106 may determine that the wireless device 106 was actually less than five meters from the access point 110 at the time of the UWB handover or that the amount of time between the meeting of the RSSI threshold and UWB position determination is shorter than average.

Finally, in step 930, the wireless device adjusts the signal strength threshold based on the correlation. For example, if the distance between the wireless device 106 and the access point 110 is typically less than five meters at the time of the UWB trigger or the time span between the meeting of the RSSI threshold and the UWB position determination is very short, the wireless device may lower the RSSI threshold. The lowering of the threshold will ensure that the wireless device user will be granted access in a timely manner and will not be delayed. Alternatively, if the distance between the wireless device 106 and the access point 110 at the time of the UWB trigger is typically greater than five meters or time span between the meeting of the RSSI threshold and the UWB determination is very long, the wireless device 106 may raise the RSSI threshold. In this instance, the raising of the RSSI threshold saves energy and delays the UWB activation process.

A method for calculating distance based on RSSI is $$d=10^{((P-S)/10N)} \tag{1}$$

where d is the estimated distance in meters, P is beacon broadcast power in dBm at one meter, S is the measured RSSI in dBm, and N is an environmental factor that may be related to absorption, interference or diffraction. Accordingly, this equation can be utilized to adjust an RSSI threshold based on the measured distances found after the UWB handover.

A similar method can be performed by the access control system 120 at the access point 110. The access control system 120 may self-adjust the RSSI or signal strength threshold based on access point signal strength, which may be estimated from a passage history table of the access point 110. Different access control systems having differing BLE systems may similarly adjust the RSSI threshold sent to the wireless device based on historical behavior.

In some embodiments, methods 400, 500, 600, 600, 800, and 900 may include additional or fewer steps or operations. Furthermore, the methods may include steps shown in each of the other methods. As one of ordinary skill in the art would understand, the methods 400 and 500 may be integrated in any useful manner. Further, the order of the steps shown is merely exemplary and the order of steps may be rearranged in any useful manner.

Figure 10:
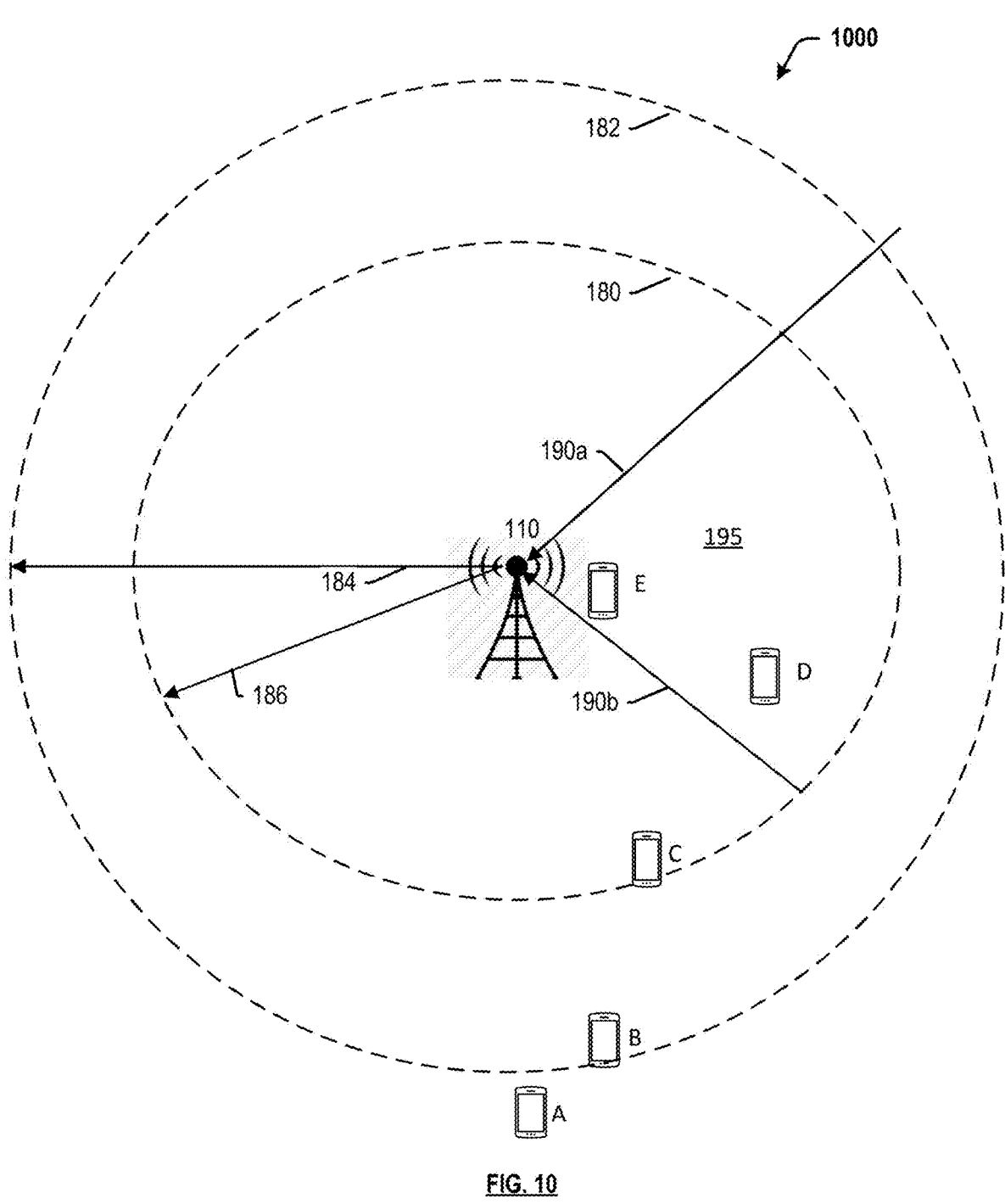
FIG. 10 illustrates an access triggering sequence in accordance with embodiments described herein.

FIG. 10 illustrates an access mechanism triggering sequence 1000 in accordance with embodiments described herein. A wireless device 106 is illustrated as approaching an access point 110. Five positions including A, B, C, D, and E of the wireless device 106 are shown for illustrative purposes. The positions are illustrated respective to distances represented by boundaries 180 and 182. Boundary 180 may represent, for example, a distance of two meters from the access point 110. Boundary 182 may represent, for example, a distance of five meters from the access point 110. Further, arrow 184 may represent the BLE ranging and triggering of UWB exchanges, and arrow 186 may represent the geolocation process using UWB.

When the wireless device 106 is in position A, the access point 110 and the wireless device 106 engage in BLE ranging. As the wireless device 106 approaches position B, which may be, for example, five meters from the access point 110, the wireless device 106 measures and transmits a signal strength, for example, RSSI to the access point 110. The access control system 120 of the access point 110 compares this signal strength to a predetermined threshold signal strength and determines that the transmitted signal strength meets the predetermined threshold. Based on the signal strength meeting the predetermined threshold, the access point 110 triggers UWB wake-up and ranging.

When the wireless device 106 reaches position C, the UWB ranging determines that one of the position criteria has been met. Specifically, the wireless device 106 is now within two meters of the access point 110. However, another criteria related to an angle of approach to the access point has not been met. In order to trigger the access mechanism, the angle of approach to the access point 110 must be between positive sixty degrees as illustrated at 190*a* and negative sixty degrees as illustrated at 190*b*. When the wireless device 106 reaches position D, the access control system 120 of the access point 110 identifies that both criteria have been met and activates the tracking system 150. More specifically, when the wireless device 106 enters an area or selected position 195 bounded by 190*a*, 190*b* and 180, which meets both the angular requirements and distance requirements as set forth above, the tracking system 150 may be activated. As set forth above, the tracking system 150 captures surrounding conditions. When no interfering objects or environmental conditions mentioned herein are detected, the access control system 120 triggers the activation when the wireless device 106 reaches position E. Accordingly, the wireless device holder is able to pass through the access point 110 seamlessly.

Further modifications and alternative embodiments will be apparent to those of ordinary skill in the art in view of the disclosure herein. For example, the devices, systems, and methods may include additional components or steps that were omitted from the diagrams and description for clarity of operation. Accordingly, this description is to be construed as illustrative only and is for the purpose of teaching those skilled in the art the general manner of carrying out the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present disclosure and following claims.

It is to be understood that the particular examples and embodiments set forth herein are non-limiting, and modifications to structure, dimensions, materials, and methodologies may be made without departing from the scope of the present disclosure.

Other embodiments in accordance with the present disclosure will be apparent to those skilled in the art from consideration of the specification and practice of the invention disclosed herein. It is intended that the specification and examples be considered as exemplary only, with being entitled to their full breadth of scope, including equivalents by the following claims.

What is claimed is:

1. A method for access control at an access point associated with a control system, the method comprising:
   locating a mobile device using a first radio access technology (RAT), the first RAT having a first location capability;
   measuring a signal strength using the first RAT and determining that the signal strength meets a predetermined signal strength threshold;
   triggering a location determination process to locate the mobile device upon determining the signal strength meets the predetermined signal strength threshold, the location determination process executed using a second RAT having a second location capability more precise than the first location capability, wherein the second RAT is Ultra Wide Band (UWB);
   responsive to triggering a location determination process, adjusting an exchange rate of UWB signals with the mobile device based on the signal strength;
   detecting a mobile device position through the location determination process, wherein the detected mobile device position corresponds to a selected position relative to the access point; and
   triggering an access sequence upon detecting the mobile device in the selected position.

2. The method of claim 1, further comprising performing an optical detection process to further locate objects within a predetermined distance of the access point and determine a position of the mobile device with respect to a different access point.

3. The method of claim 2, further comprising releasing the mobile device and halting the access sequence upon detecting that the mobile device is within a threshold distance of the different access point.

4. The method of claim 3, further comprising initiating the access sequence at the different access point subsequent to release.

5. The method of claim 3, further comprising determining the access sequence based on the optical detection process.

6. The method of claim 1, wherein the first RAT is Bluetooth Low Energy (BLE).

7. The method of claim 1, wherein adjusting an exchange rate of UWB signals with the mobile device based on the signal strength comprises decreasing a time between UWB signals as the signal strength increases.

8. The method of claim 1, wherein the predetermined signal strength threshold is a received signal strength indicator (RSSI).

9. The method of claim 8, wherein the RSSI is reported by the mobile device to the control system.

10. The method of claim 8, further comprising self-adjusting the predetermined signal strength threshold at the mobile device based on a passage history of the mobile device through the access point.

11. The method of claim 8, further comprising self-adjusting the predetermined signal strength threshold at the control system based on access point signal strength.

12. The method of claim 1, wherein the selected position is based on distance from the access point and an angle of approach to the access point.

13. The method of claim 1, further comprising associating multiple adjacent access points with corresponding control systems.

14. The method of claim 1, further comprising releasing the mobile device and delaying triggering the access sequence when the detected position is within a threshold distance of a different access point.

15. A system for access control, the system comprising:

at least one access point;

multiple antennas mounted to the access point, the antennas communicating with a mobile device; and a processor controlling the access point and executing instructions to perform multiple operations including:

locating the mobile device using a first radio access technology (RAT), the first RAT having a location capability;

measuring a signal strength using the first RAT and determining that the signal strength meets a predetermined threshold;

triggering a location determination process to locate the mobile device upon determining the signal strength meets the predetermined threshold, wherein:

the location determination process is executed using a second RAT having a more precise location capability than the first RAT; and triggering a location determination process comprises increasing an exchange rate of RAT signals with the mobile device as the signal strength increases;

detecting, through the location determination process, that the mobile device is in a selected position; and triggering an access sequence upon detecting the mobile device in the selected position, causing opening of the access point.

16. The system of claim 15, wherein the selected position is determined utilizing a distance from the access point and an angle of approach to the access point.

17. The system of claim 15, further comprising performing an optical detection system to further locate objects within a predetermined distance of the access point and determine a position of the mobile device with respect to a different access point.

18. The system of claim 17, the operations further comprising releasing the mobile device and halting the access sequence upon detecting that the mobile device is within a threshold distance of the different access point.

19. The system of claim 15, wherein the first RAT is Bluetooth Low Energy (BLE).

20. The system of claim 15, wherein the second RAT is Ultra Wide Band (UWB).

21. A method for operating an access point comprising:

performing initial signal detection and authentication utilizing a first RAT allowing an information exchange between a control system and a mobile device;

triggering a location determination process performed by a second RAT to locate the mobile device, wherein:

the location determination process is triggered in response to determining that a signal strength measured with the first RAT meets a predetermined threshold;

the location determination process is executed using the second RAT; and the location determination process comprises increasing an exchange rate of RAT signals with the mobile device;

receiving a notification through the location determination process, that the mobile device is in a selected position relative to the access point;

utilizing an additional detection system to assess conditions surrounding the mobile device and the access point; and triggering an access sequence upon detecting the mobile device in the selected position and the surrounding conditions meeting specified criteria.

\* \* \* \* \*